United States Patent Office 3,095,297
Patented June 25, 1963

3,095,297
PROCESS FOR THE PREPARATION OF N,N'-ETHYLENE - BIS - [2 - (o - HYDROXYARYL)GLYCINE] FERRIC CHELATES
Ekbert Lederle Rembe, Badalona, Spain, assignor of onehalf to Sociedad Anonima Cros, Barcelona, Spain
No Drawing. Filed Sept. 1, 1960, Ser. No. 53,364
Claims priority, application Spain May 27, 1960
6 Claims. (Cl. 71—1)

The N,N'-ethylene-bis-[2-(o-hydroxyaryl)glycine] ferric chelate is important for the correction of iron chlorosis in ornamental and farm plants growing in alkaline soils.

The methods previously known in the preparation of such chelates are rather complicated, leading to an overall yield of only 50% or less.

It has now been found that overall yields of 70% and more are attainable if an organic compound of the constitution

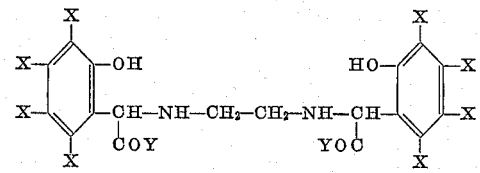

wherein X is selected from the group comprising hydrogen, alkyl, halogen and sulfo, and Y may be $-NH_2$, $-OH$, OMe ($Me^I=K$, Na, $NH_4$), is reacted in solid state with a crystalline iron salt, at a temperature between 0° and 80° C.

It is not necessary for the substance to be completely dry; small amounts of humidity resulting from the crystallization water of the iron salts may be present or be added to improve the mixture of the reactants.

The iron salts may be neutral or basic compounds and salts of bivalent iron may also be used, since surprisingly in the presence of the organic chelating agent, the stoichiometric quantity of bivalent iron is instantly oxidized by the (atmospheric) oxygen to trivalent iron.

The anion of the iron salts does not effect this reaction; it is nevertheless recommended to use the anions generally employed in artificial fertilizers, such as, nitrates, sulfates, carbonates, chlorides and phosphates.

The amount of iron salts to be used must, for economic reasons, be stoichiometric, but it is advisable to employ a great excess of iron salts thus providing a reserve of iron compounds in the soil; for it has been demonstrated that the plant resorbs only the iron of the ferric chelate, leaving the organic chelating agent in the soil, which can then again supply assimilable iron to the plant. In tests developed in the soil, a synergism has been found between the chelate and the iron salts in excess. These products with an excess of iron salts show in the microscope that the chelate, for the most part is dissolved in the crystallization water of the iron salts in excess.

The present invention is illustrated in the following examples:

Example 1

36 g. of the N,N'-ethylene-bis-[2-(o-hydroxyphenyl)-glycine]monoamide are mixed in a mortar at a temperature of 20–30° C. with 49 g. of ferric alum, until the mixture develops a blackish colour, it indicates that the chelate has been formed. An aqueous solution of the product has at 470 mμ an extinction coefficient corresponding to a yield of 94% as compared with a standard solution of a chelate and referred to the initial monoamide.

Example 2

400 g. of the N,N' - ethylene - bis - [2 - (o - hydroxyphenyl)glycine]disodic salt are mixed with 500 g. of $Fe(NO_3)_2.9H_2O$ at room temperature; the ferric chelate is formed almost instantly. The aqueous solution shows as described in the previous example a yield of 98.5% referred to the initial disodic salt.

Example 3

In a beaker are put 44 g. of the N,N'-ethylene-bis-[2-(1-hydroxy-4-sulfonic-phenyl)glycine] and 28 g. of $FeCl_3.6H_2O$; 15 g. of potassium carbonate are added to decrease the acidity. The mixture is stirred with a glass rod and heated at 37° C. This results in a viscous mass of blackish colour. The yield in chelate, determined colorimetrically, is 90%.

Example 4

In a mechanical mixer 40 kg. of N,N'-ethylene-bis-[2-(o-hydroxyphenyl)glycine]monoamide hydrochloride are combined with 130 kg. of $FeSO_4.7H_2O$. In order to convert the hydrochloride in the neutral monoamide, the mixture is treated with a concentrated aqueous solution of ammonia (total 4 kg. $NH_3$) or with a corresponding quantity of ammonia gas; the contents of the mixer are blended for ½–1 hour until the typical blackish colour appears. The spectrometric analysis shows a content of 22% of the ferric chelate in the mixture, i.e. a yield of 99% with reference to the initial monoamide hydrochloride.

The products obtained following the description of this invention, are applied in the control of iron chlorosis in ornamental and farm plants, dissolving them in the irrigation water of the plants or adding them directly to the soil on the reach of the roots. Because of their high content of active substance and assimilable iron, the use of very small amounts (between 2 and 100 g. depending on the size of the plant) results in complete correction of the chlorosis.

This invention can be performed following other methods differing in details from those defined in the examples. It will be therefore permissible for it to be employed with proper methods and apparatus, and still remain all that is in the spirit of the claims.

I claim:

1. Composition which consists of (1) chelating agent of the formula

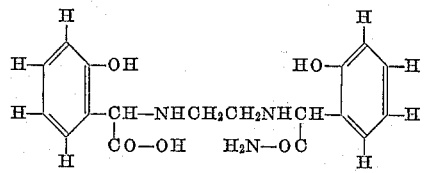

combined with trivalent iron, and (2) iron salts with water of crystallization, the total iron in said composition being in molecular ratio of greater than 1:1 with respect to chelate, and said iron chelate being dissolved in said water of crystallization.

2. Process for the preparation of N,N'-ethylene-bis-[2(o-hydroxyaryl)glycine]ferric chelate, which comprises reacting in solid state at a temperature between 0 and 80° C. a compound of the formula

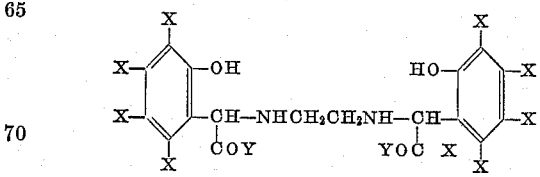

wherein X is selected from the group consisting of hydrogen, alkyl, and sulfo, and Y is a member selected from the group consisting of —$NH_2$, —OH, —ONa, —OK and —$ONH_4$, with a crystalline iron salt containing water of crystallization.

3. Process of claim 2, wherein the iron salt contains water of crystallization and is retained in substantially solid state entirely during the reaction.

4. Process of claim 2, wherein the iron salt is a member selected from the group consisting of ferric alum, $Fe(NO_3)_2 \cdot 9H_2O$, $FeCl_3 \cdot 6H_2O$, and $FeSO_4 \cdot 7H_2O$.

5. Process of claim 2, wherein the iron salt which contains water of crystallization is in excess over the stoichiometric reaction requirement.

6. Process of claim 5, which comprises reacting in solid state at a temperature between 0 and 80° C. a compound of the formula

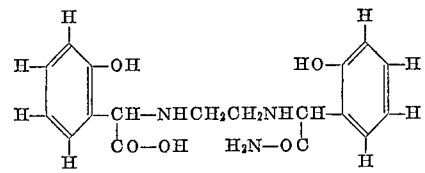

with an excess of a crystalline iron salt which contains water of crystallization.

References Cited in the file of this patent
UNITED STATES PATENTS

| | | |
|---|---|---|
| 2,824,128 | Dexter | Feb. 18, 1958 |
| 2,847,437 | Vaughan | Aug. 12, 1958 |
| 3,028,407 | Knell et al. | Apr. 3, 1962 |